United States Patent
Wang et al.

(10) Patent No.: US 9,548,776 B2
(45) Date of Patent: Jan. 17, 2017

(54) INTERFERENCE CANCELATION USING COOPERATIVE SENSING

(71) Applicant: QUALCOMM Incorporated, San Diego, CA (US)

(72) Inventors: Jibing Wang, San Diego, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/157,280

(22) Filed: Jan. 16, 2014

(65) Prior Publication Data
US 2015/0200697 A1 Jul. 16, 2015

(51) Int. Cl.
*H04B 1/10* (2006.01)
*H04B 15/00* (2006.01)
*H04B 1/12* (2006.01)
*H04B 1/00* (2006.01)

(52) U.S. Cl.
CPC ............ *H04B 1/123* (2013.01); *H04B 1/0028* (2013.01); *H04B 1/126* (2013.01)

(58) Field of Classification Search
CPC ........ H04B 1/123; H04B 1/0028; H04B 1/126
USPC ...... 455/454, 63.1, 296, 303, 305, 306, 307, 455/311, 312
See application file for complete search history.

(56) References Cited

U.S. PATENT DOCUMENTS

| | | | |
|---|---|---|---|
| 5,046,133 A * | 9/1991 | Watanabe et al. ............ 455/138 |
| 5,818,517 A * | 10/1998 | Hudson et al. ................. 348/21 |
| 5,940,143 A * | 8/1999 | Igarashi et al. ............... 348/678 |
| 8,320,868 B2 | 11/2012 | Pratt et al. |
| 8,750,805 B2 * | 6/2014 | Singhal .................. H03K 3/017 455/63.1 |
| 2004/0209652 A1 * | 10/2004 | Doi .............................. 455/561 |
| 2008/0292008 A1 * | 11/2008 | Kondo et al. ................. 375/260 |
| 2011/0212692 A1 | 9/2011 | Hahn et al. |
| 2011/0312275 A1 * | 12/2011 | Canpolat ............ H04L 25/0328 455/63.1 |
| 2012/0214524 A1 * | 8/2012 | Wajcer et al. ................ 455/502 |
| 2012/0287968 A1 | 11/2012 | Gainey et al. |
| 2012/0294395 A1 * | 11/2012 | Jones ...................... H04J 11/004 375/341 |
| 2013/0044791 A1 | 2/2013 | Rimini et al. |
| 2013/0052964 A1 | 2/2013 | Husted |
| 2013/0142273 A1 | 6/2013 | Sollenberger et al. |
| 2015/0180685 A1 * | 6/2015 | Noest ................... H04B 1/0475 375/219 |

\* cited by examiner

*Primary Examiner* — Nguyen Vo
(74) *Attorney, Agent, or Firm* — DeLizio, PLLC

(57) ABSTRACT

A first receiver of a victim communication device may detect a first signal from an aggressor transmitter that potentially may interfere with a second signal intended to be received at a second receiver of the victim communication device. It may be determined whether the first signal interferes with the second signal based, at least in part, on the characteristics of the first signal and the second receiver. If the first signal may interfere with the second signal, the second receiver may implement reconstruction and cancelation of the interference attributable to the first signal.

30 Claims, 9 Drawing Sheets

INTERFERENCE CANCELATION USING COOPERATIVE SENSING

BACKGROUND

Embodiments of the present disclosure generally relate to the field of communication systems, and, more particularly, to interference cancelation using at least two receivers of a communication device.

It is common for conventional wireless communication systems to integrate multiple radios into a single communication device. For example, a communication device might include at least two radios, such as a wireless local area network (WLAN) radio and a wireless wide area network (WWAN) radio. Each radio may independently send and receive radio signals. Radio signals from one source may interfere with radio signals from another source, even if the radio signals are not on the same fundamental frequencies. Interference associated with a signal from a different communication system may cause degradation of performance.

Self-jamming interference refers to interference caused by an aggressor transmitter that is co-located with a victim receiver in the same communication device. Interference cancelation may be used to mitigate self-jamming interference. Using conventional techniques for interference cancelation, a victim receiver may remove an estimated interference signal component from a received signal based on a known transmitted signal of the co-located aggressor transmitter. However, a source of interference may be an unknown signal from an external device (e.g., not co-located in the same communication device).

SUMMARY

Disclosed are various embodiments of interference cancelation using at least two receivers of a communication device. The communication device may identify an interfering first signal at one receiver and remove interference attributable to the interfering first signal from a second signal received at a different receiver. In one embodiment, a first receiver of a victim communication device may detect an interfering first signal from an aggressor communication device. A second receiver of the victim communication device may detect a composite signal that comprises a desired second signal intended for the second receiver and interference caused by the interfering first signal. Interference cancelation may be performed to remove at least a portion of the interference caused by the interfering first signal from the composite signal to obtain the desired second signal. In one embodiment, the first receiver may generate a first baseband reference signal based, at least in part, on the interfering first signal. The interference cancelation may be based, at least in part, on the first baseband reference signal from the first receiver. The communication device may use the first baseband reference signal to reconstruct interfering components of the interfering first signal that interfere with the desired second signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
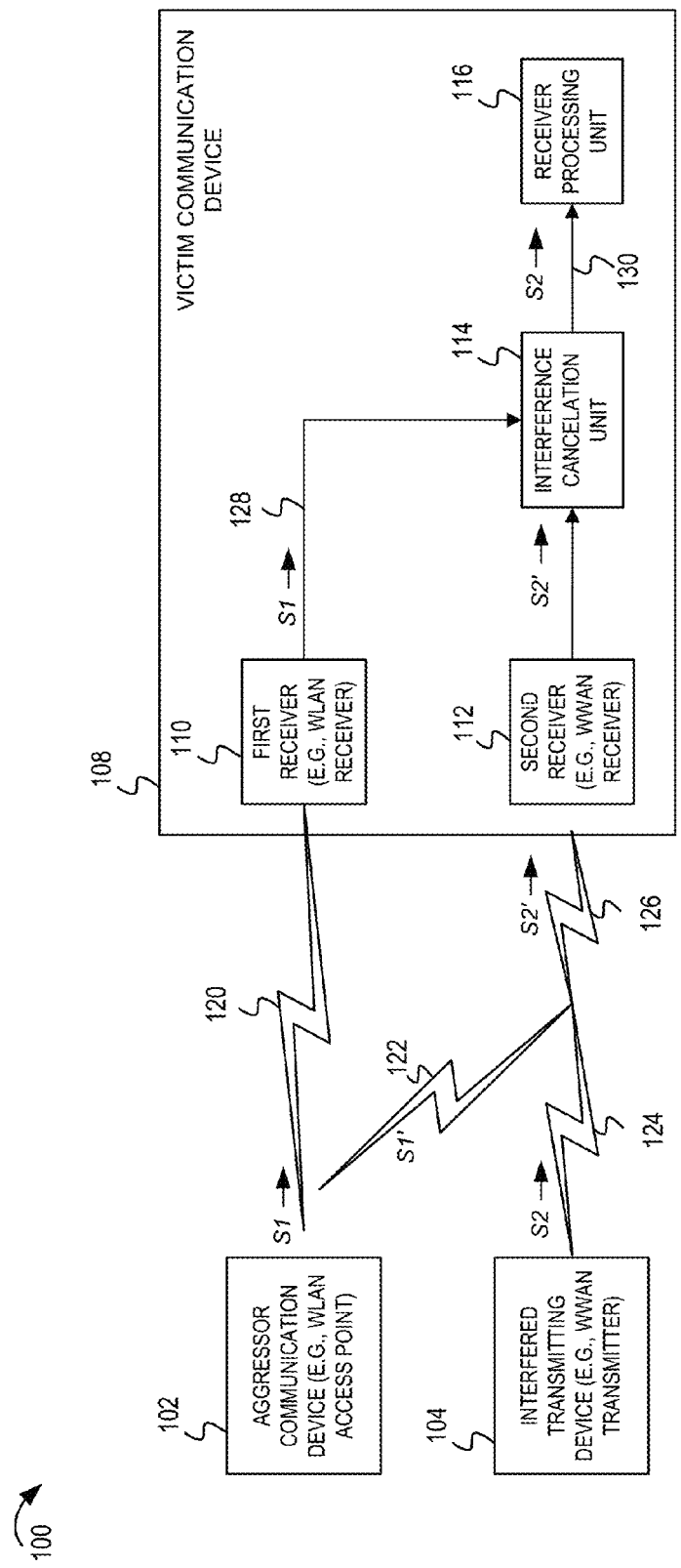
FIG. 1 is an example system diagram to introduce concepts of interference cancelation using at least two receivers of a communication device in accordance with an embodiment of this disclosure.

The description that follows includes exemplary systems, methods, techniques, instruction sequences and computer program products that embody techniques of the present disclosure. However, it is understood that the described embodiments may be practiced without these specific details. Although example embodiments refer to non-linear interference cancelation of wireless signals, the embodiments described herein may apply to linear cancelation. Furthermore, although the example embodiments may refer to wireless receivers, the description is not limited to wireless embodiments. For example, in some embodiments the disclosed techniques may be used in a communication device having wired receivers or having a combination of wireless and wired receivers. Moreover, embodiments may include different hardware configurations than those discussed herein. In other instances, well-known instruction instances, protocols, structures and techniques have not been shown in detail in order not to obfuscate the description.

In some networks, a first signal transmitted from one communication device, referred to as an aggressor communication device, might interfere with a second signal intended for another communication device, referred to as a victim communication device. The first signal may be referred to as an interfering first signal in this disclosure if it causes interference to the second signal (also referred to as a desired second signal). To mitigate interference caused by the interfering first signal, a victim communication device may use at least two receivers. The first receiver may detect the interfering first signal from the aggressor communication device. The victim communication device may determine whether the interfering first signal might cause interference to the desired second signal. If the interfering first signal is determined to cause interference to the desired second signal, an interference cancelation technique may be performed to reconstruct and remove the interference caused by the interfering first signal. In this disclosure, cooperative sensing refers to use of a first receiver of a communication device to detect an interfering first signal that causes interference to a desired second signal intended for a second receiver of the communication device.

In one embodiment, a victim communication device may include a first receiver and a second receiver. The first receiver may detect an interfering first signal from an aggressor communication device. The first receiver may generate a first baseband reference signal based, at least in part, on the interfering first signal. A second receiver of the victim communication device may detect a composite signal. The composite signal may comprise the desired second signal intended for the second receiver combined with interference caused by the interfering first signal. Using the first baseband reference signal generated at the first receiver, the second receiver may generate a cancelation signal. The cancelation signal may comprise reconstructed portions of the interference attributable to the interfering first signal. The cancelation signal may be subtracted from the composite signal to mitigate the interference caused by the interfering first signal. The desired second signal (or an improved second signal that more closely resembles the desired second signal) may be recovered from the composite signal as a result of removing the interference caused by the interfering first signal from the composite signal.

In another embodiment, the interfering first signal may be a third-party transmission between the aggressor communication device and another communication device different from the victim communication device. The victim communication device may opportunistically sense a communication medium to detect the interfering first signal. Interference cancelation may be activated based, at least in part, on a frequency or power of the interfering first signal.

FIG. 1 is a system diagram 100 depicting an aggressor communication device 102, an interfered transmitting device 104, and a victim communication device 108. The victim communication device 108 may include a first receiver 110, a second receiver 112, an interference cancellation unit 114, and a receiver processing unit 116. The aggressor communication device 102 may transmit an interfering first signal 120, denoted as S1. It should be understood that the interfering first signal 120 may be intended for the first receiver 110 or may be intended for another communication device (not shown). An interfered transmitting device 104 may transmit a desired second signal 124, denoted as S2. In FIG. 1, the desired second signal 124 is be intended to be received at the second receiver 112. However, the interfering first signal S1 may interfere with the desired second signal 124. The interference is depicted as interference 122 and noted as S1'. Interference 122 from the interfering first signal S1 may combine with the desired second signal S2 to produce a composite signal 126 (denoted as S2'). Thus, the composite signal 126 S2' may include components of the interfering first signal 120. For example, the composite signal 126 S2' may include interference S1' caused by the interfering first signal S1. In one example, the interference 122 may be at the fundamental frequency of S2' or integer multiples thereof, also called harmonics. The interfering first signal S1 may interfere with the desired second signal S2 producing the composite signal 126 S2' detected by the second receiver 112.

In accordance with embodiments of this disclosure, the first signal 120 detected by the first receiver 110 may be used to reconstruct the interference 122. The interference cancellation unit 114 may remove at least a portion of the reconstructed interference 122 from the composite signal 126 to obtain an improved second signal 130. The improved second signal 130 may be closer in fidelity to the desired second signal 124 than the composite signal 126.

In one embodiment, the first receiver 110 may generate a first baseband reference signal 128 based, at least in part, on the interfering first signal 120. As discussed below, the first receiver 110 can extract the in-phase (I) and quadrature (Q) components of the interfering first signal 120, generating a first baseband reference signal 128 from the I and Q components. In some embodiments, the first baseband reference signal 128 may be equivalent to the interfering first signal 120. Regardless of whether the first baseband reference signal 128 is exactly the same as the interfering first signal 120, the first baseband reference signal 128 may be used to reconstruct the effect of the interference 122 S1' form the interfering first signal 120 S1 on the composite signal 126. The first receiver 110 may send the first baseband reference signal 128 to an interference cancelation unit 114. The interference cancelation unit 114 may reconstruct the interference 122. For example, the interference cancellation unit 114 may generate a cancelation signal that represents the reconstructed interference 122. The interference cancelation unit 114 may remove (e.g., cancel) at least a portion of the interference 122 from the composite signal 126 by subtracting the cancelation signal from the composite signal 126 to recover the improved second signal 130. In one embodiment, the improved second signal 130 is equivalent to the desired second signal 124 without the effects of the interference 122. Regardless of whether the improved second signal 130 is identical or not identical to the desired second signal 124, the improved second signal 130 will be closer in fidelity to the desired second signal 124 than the composite signal 126. The improved second signal 130 may be sent to the receiver processing unit 116 for further signal processing.

In one embodiment, the first receiver 110 and the second receiver 112 may be associated with different communication protocols. For example, the aggressor communication device 102 may be a WLAN access point. The interfered transmitting device 104 may be a WWAN transmitter. The first receiver 110 may be a WLAN receiver configured to receive WLAN transmissions, such as those produced by the aggressor communication device 102. The second receiver 112 may be a WWAN receiver configured to receive WWAN transmissions from the interfered transmitting device 104. Even though the first receiver 110 and second receiver 112 are associated with different communication protocols, the victim communication device 108 may utilize the first receiver 110 to improve the quality of the signals processed by the second receiver 112. It should be understood that although the frequency bands associated with the first and second receivers 110, 112 may differ, a transmission associated with the first receiver 110 may still interfere with transmissions associated with the second receiver 112. For example, harmonic multiples of particular frequencies may produce spectral byproducts in the composite signal 126 S2'.

Figure 2:
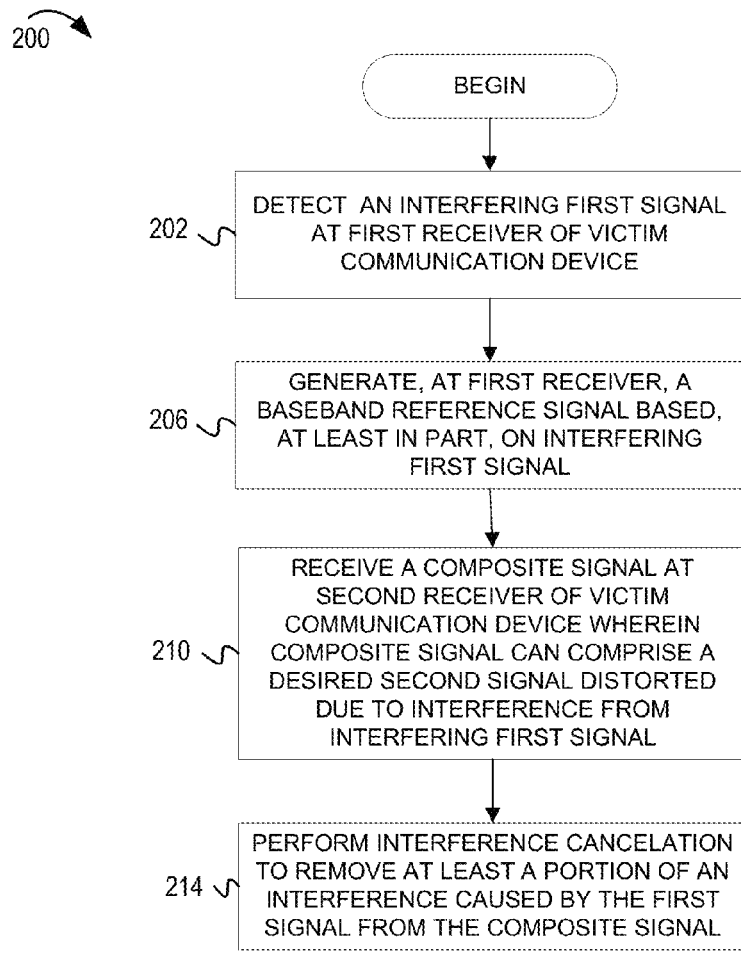
FIG. 2 is a flow diagram illustrating example operations of interference cancelation in accordance with an embodiment of this disclosure.

FIG. 2 is a flow chart (flow) 200 depicting operations associated with cooperative sensing. At block 202, an interfering first signal is detected at the victim communication device. For example, the interfering first signal may be detected by the first receiver of the victim communication device. At block 206, the first receiver of the victim communication device generates a first baseband reference signal based, at least in part, on the interfering first signal. At block 210, the second receiver may receive a composite signal. The composite signal might include a desired second signal distorted due to the interfering first signal. At block 214, the second receiver may perform interference cancelation on the composite signal to remove at least a portion of interference caused by the interfering first signal.

Figure 3:
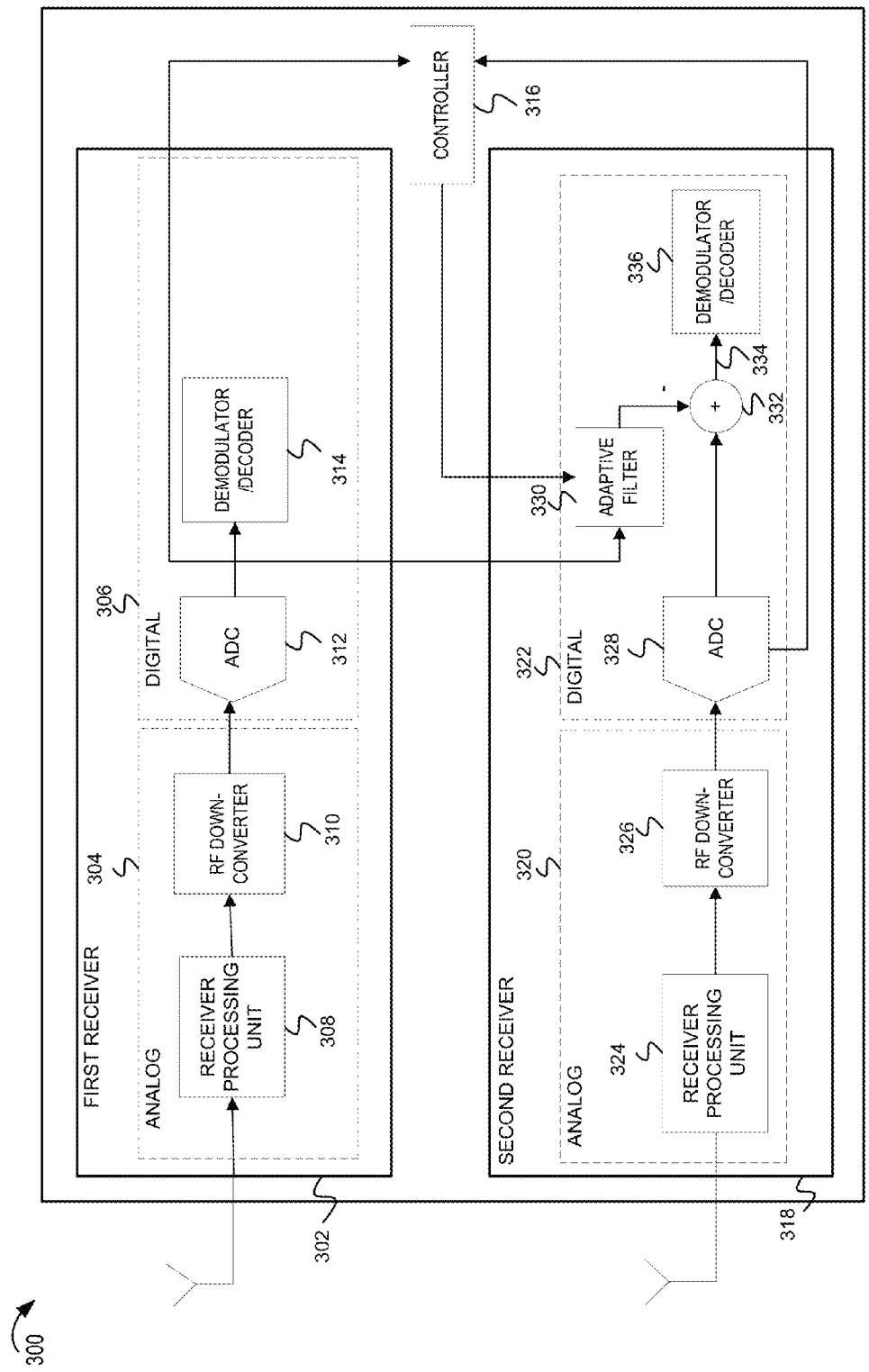
FIG. 3 is a system diagram illustrating use of a digital baseband reference signal for interference cancelation in accordance with an embodiment of this disclosure.

FIG. 3 is a system diagram depicting components of a communication device 300 that may implement cooperative sensing. The communication device 300 may include a first receiver 302 and a second receiver 318. The first receiver 302 and the second receiver 318 each may include an analog component 304, 320 and a digital component 306, 322. The analog component 304, 320 may include a receiver processing unit 308, 324. Each receiver processing unit 308, 324 may include components such as surface acoustic wave (SAW) filters, low noise amplifiers (LNA), low pass filters, and other components. Additionally, each analog component 304, 320 may include an RF down-converter 310, 326. The digital components 306, 322 may include an analog-to-digital converter (ADC) 312, 328 and a demodulator/decoder 314, 336. The first receiver 302 may include the demodulator/decoder 314 to process a received signal for the first receiver 302. The second receiver 318 may include the demodulator/decoder 336 to process a received signal intended for the second receiver 336. In this disclosure, the first receiver 302 may improve a signal intended for the second receiver 336 prior to demodulation/decoding at the second receiver 336.

The second receiver 318 may include an adaptive filter 330 and a combiner 332. The communication device 300 may include a controller 316. In some embodiments, the controller 316 may be situated in the first receiver 302, in the second receiver 318, or in another component of the communication device 300. In some embodiments, each of the first receiver 302 and the second receiver 318 may include separate controllers that together perform the functionality of controller 316 described herein.

The first receiver 302 may detect an interfering first signal. The second receiver 318 may receive a composite signal, and the composite signal might be a desired second signal if undistorted by the interfering first signal. The interfering first signal may be received at the receiver processing unit 308, where it may be sent to a low noise amplifier (LNA), a low pass filter, or other filters. The interfering first signal may be sent to the RF-down converter 310. The RF down-converter 310 may transform the interfering first signal into a first baseband reference signal by extracting the I and Q components of the interfering first signal. The first baseband reference signal may be sent to the ADC 312, where the first baseband reference signal is sampled and converted to a digital first baseband reference signal. The second receiver 318 may similarly process the composite signal, sending it to the receiver processing unit 324, the RF down-converter 326, and the ADC 328. Thus, the output of ADC 328 may be a digital baseband representation of the composite signal, which may be referred to as the digital composite signal. The digital first baseband reference signal may be sent to an adaptive filter 330 and a controller 316. At the adaptive filter 330, components of the interfering first signal that constitute transmitter interference may be reconstructed based, at least in part, on the baseband reference signal. The reconstructed components of the interference attributable to the interfering first signal may comprise a cancelation signal. The cancelation signal may be sent to a combiner 332. At the combiner 332, the cancelation signal may be subtracted from the digital composite signal. Thus, the output of the combiner may be an improved second signal 334. The improved second signal 334 may be sent to the demodulator/decoder 336. The demodulator/decoder 336 can process the improved second signal 334 to obtain the data included in the improved second signal 334.

In one embodiment, the communication device 300 may be capable of reducing power consumption by selectively activating interference cancelation based, at least in part, on a characteristic of the interfering first signal. In one implementation, a controller 316 may be used to determine whether an interfering first signal may interfere with a desired second signal at the second receiver 318. If the controller 316 determines that an interfering first signal may interfere with a desired second signal at the second receiver 318, the controller 316 may cause the adaptive filter 330 to reconstruct and remove at least a portion of the interfering first signal from the composite signal. The controller 316 may be configured to compare the frequency of the interfering first signal with the frequency band of the second receiver 318 to determine whether the frequency of the interfering first signal is a harmonic multiple of the frequencies in the frequency band of the second receiver 318. If the frequency of the interfering first signal is a harmonic multiple of any frequency in the frequency band of the second receiver 318 then the interfering first signal may interfere with the desired second signal so that the composite signal includes components of the desired second signal and the interfering first signal. The controller 316 may also be configured to store parameters such as the range of power to which the second receiver 318 may amplify received signals. In one embodiment, the controller 316 may compare the power of the interfering first signal and the power range of an LNA of the receiver processing unit 324. If the power of the transmitted first signal is greater than the power range of an LNA of the receiver processing unit 324, then the controller 316 may cause the adaptive filter 330 to reconstruct the interference associated with the interfering first signal. The interference associated with the interfering first signal may be removed at the combiner 332. In another embodiment, the controller 316 may be configured to store a threshold power level such that if the power of the interfering first signal exceeds the threshold, then the controller will cause the adaptive filter 330 to reconstruct the interference associated with the interfering first signal.

Figure 4:
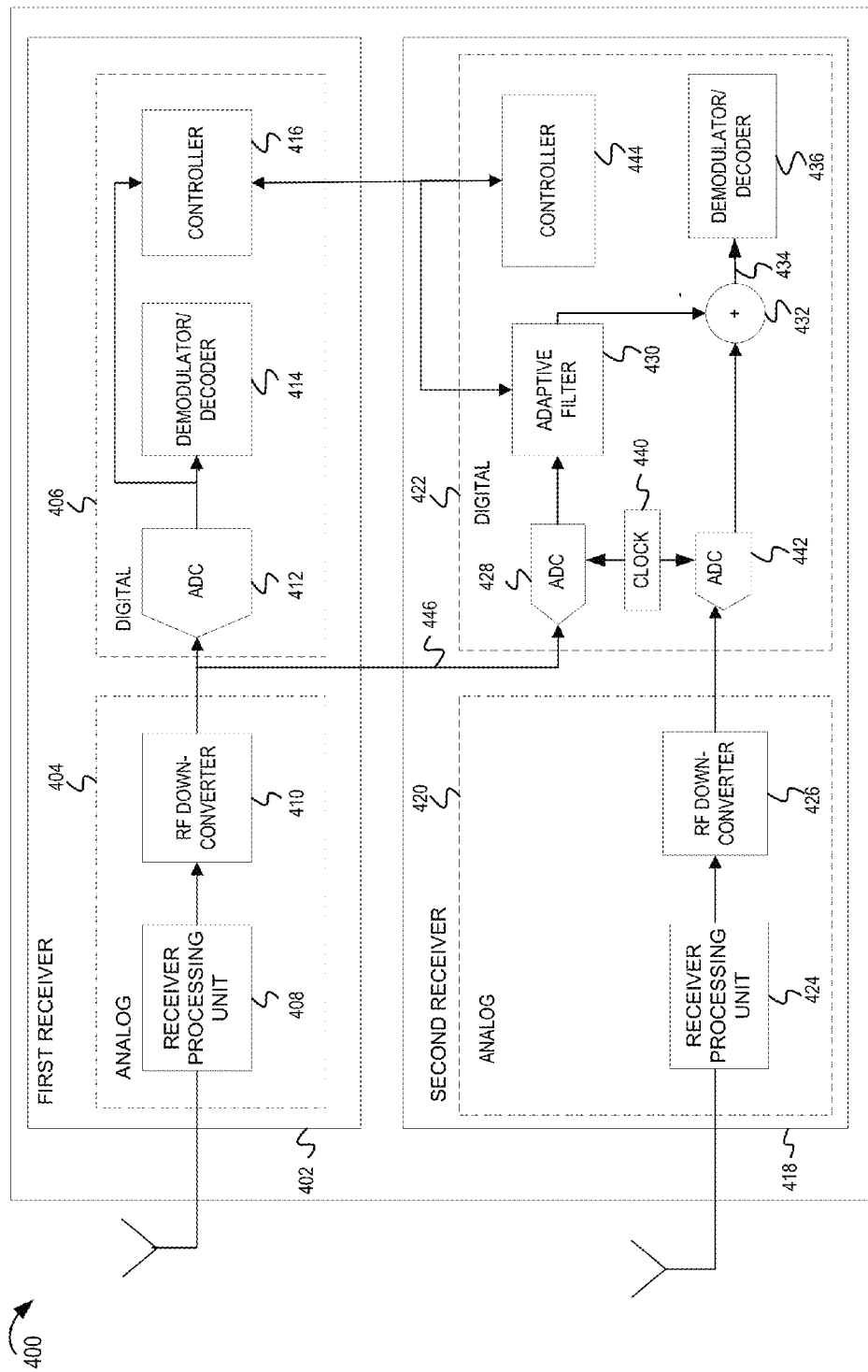
FIG. 4 is a system diagram illustrating use of an analog baseband reference signal for interference cancelation in accordance with an embodiment of this disclosure.

FIG. 4 depicts another embodiment of a communication device 400 that may implement cooperative sensing. The communication device 400 includes a first receiver 402 and a second receiver 418. Additionally, each receiver 402, 418 has an analog portion 404, 420 and a digital portion 406, 422 respectively. The analog portion 404, 420 processes analog signals, and the digital portion 406, 422 converts the analog signal received from the analog portion 404, 420 to a digital signal and processes the digital signal. The first receiver 402 and the second receiver 418 each may include a receiver processing unit 408, 424 that may include low noise amplifiers, low pass filters, and possibly other signal processing components. Moreover, the first receiver 402 and the second receiver 418 may include a RF down-converter 410, 426. The digital portion 406 of the first receiver 402 may include an ADC 412, a demodulator/decoder 414, and a controller 416. The demodulator/decoder 414 may be used by the first receiver 402 to process signals intended for the first receiver 402. In some embodiments, the demodulator/decoder 414 may be disabled or unused when the first receiver 402 is detecting for an interfering first signal. The digital portion 422 of the second receiver 418 may include a first ADC 428, an adaptive filter 430, a clock 440, a second ADC 442, a controller 444, and a demodulator/decoder 436.

The first receiver 402 may detect an interfering first signal. The interfering first signal may interfere with a desired second signal, producing a composite signal as described in FIG. 3. The desired second signal may be a signal intended for the second receiver 418. The first receiver 402 may cooperate with the second receiver 418 by converting the interfering first signal to a first baseband reference signal, which the second receiver 418 may use to reconstruct the interference attributable to the interfering first signal and remove at least a portion of the interference attributable to the interfering first signal from the composite signal. In particular, the interfering first signal may be received by a receiver processing unit 408, where the interfering first signal may be processed through a low noise amplifier, one or more low pass filters, and other signal processing components including without limitation oscillators. The RF down-converter 410 may receive the interfering first signal, processed through the receiver processing unit 408. The RF down converter may convert the interfering first signal to a first baseband reference signal, obtaining the I and Q components of the interfering first signal. The resulting first baseband reference signal may be sent to the ADC 428 of the second receiver 418. The composite signal may undergo similar processing. As illustrated in FIG. 4, the composite signal may be received and processed by the receiver processing unit 424 and be converted into a second baseband reference signal via the RF down-converter 426. The RF down-converter 426 may provide the second baseband reference signal to the ADC 442. A clock 440 may synchronize the sampling of the first baseband reference signal at the ADC 428 and the sampling of the second baseband reference signal at the ADC 442 so that the first baseband reference signal and the second baseband reference signal are sampled at similar rates (e.g., synchronously). The first baseband reference signal may be sent to the adaptive filter 430. The adaptive filter 430 may reconstruct the interference attributable to the interfering first signal based, at least in part, on the first baseband reference signal. The reconstructed interference attributable to the interfering first signal may comprise a cancelation signal. The cancelation signal may be subtracted from the second baseband reference signal at the combiner 432. Thus, at least a portion of the interference attributable to the interfering first signal may be removed from the resulting improved second signal 434. The resulting improved second signal 434 may be sent to the demodulator/decoder 436. The demodulator/decoder 436 can process the improved second signal 434 to obtain the data associated with the improved second signal 434. In some embodiments, the demodulator/decoder 436 may extract the carrier signal from the improved second signal 434 to obtain the data. The demodulator/decoder 436 may perform demodulation and/or decoding procedures to recover the transmitted data.

As in FIG. 3, a controller of the first receiver can determine that the interfering first signal is unlikely to interfere with the desired second signal based on characteristics of the interfering first signal. Hence, power need not be expended on removing the interfering first signal via the adaptive filter 430 and the combiner 432. A controller 416 may obtain an indication of the frequency and power of the interfering first signal. The frequency and power parameters of the desired second signal expected to be received at receiver 418 may be known a priori, since the second receiver 418 is designed to receive signals within a particular frequency band and power range. In one embodiment, the controller 416 may send an indication of the power and frequency of the interfering first signal to the controller 444.

The controller 444 may compare the frequency of the interfering first signal and the frequency range of the signals expected to be received at the second receiver 418. If the frequency of the interfering first signal is a harmonic multiple of a frequency in the frequency range of the signals expected to be received at the second receiver 418, then the interfering first signal might interfere with a desired second signal, producing a composite signal. In one implementation, the controller 444 may instruct the adaptive filter 430 to reconstruct and cancel the interfering first signal from the composite signal. In another embodiment, the controller 444 also may compare the power of the interfering first signal and the power range of the signals expected to be received at the second receiver 418. If the power of the interfering first signal exceeds a threshold associated with the power range of signals expected to be received at the second receiver 418, then controller 444 may implement reconstruction and cancelation of the interfering first signal at the adaptive filter 430.

Figure 5:
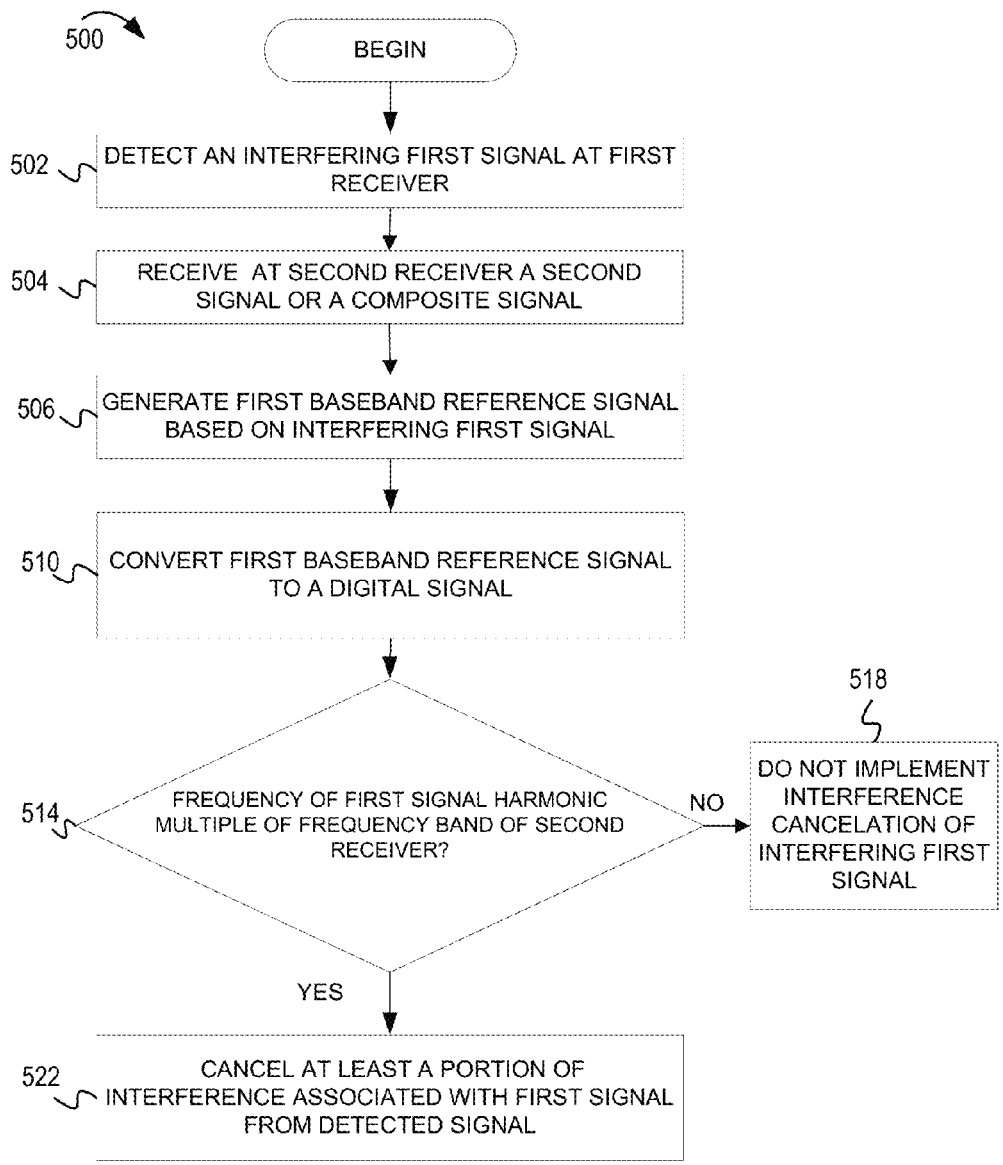
FIG. 5 is a flow diagram illustrating example operations for performing interference cancelation based, at least in part, on frequency of an interfering first signal in accordance with an embodiment of this disclosure.

FIG. 5 is a flow diagram 500 showing example operations involving cooperative sensing. At block 502, an interfering first signal is detected at a first receiver. In one example, the interfering first signal may be noise, such as RF noise or electromagnetic interference (EMI) emitted by a power-line, natural source, or another device that is inadequately shielded. In other examples, the interfering first signal also may be a transmission from another device. The flow proceeds to block 504. At block 504, a second signal may be received at a second receiver. The second signal may be a signal intended for the second receiver. Thus, the second signal may be referred to as a desired second signal. Due to interference from the interfering first signal, the signal received at the second receiver may deviate from the desired second signal. The second signal that has been corrupted with interference from the interfering first signal may be referred to as the composite signal. The flow proceeds to block 506. At block 506, a first baseband reference signal is generated from the interfering first signal. The I and Q components of the interfering first signal may be determined at a RF down-converter of a first receiver. These I and Q components constitute the first baseband reference signal. At block 510, the first baseband reference signal generated from the interfering first signal may be converted to a digital signal. In one implementation, the RF down-converter also includes an ADC. The ADC may sample the analog first baseband reference signal and convert the analog first baseband reference signal to a digital first baseband reference signal. In another embodiment, the analog first baseband reference signal is sent to an ADC of the first or second receiver, where the analog first baseband reference signal is sampled and converted to a digital first baseband reference signal. The flow proceeds to block 514. At block 514, a frequency of the interfering first signal is compared with a frequency of the expected second signal to determine whether the frequency of the interfering first signal is a harmonic multiple of the frequency of the expected second signal. As discussed in FIGS. 3 and 4, the characteristics of the class of signals received at the second receiver are known. Therefore, in one embodiment, the frequency of the interfering first signal may be compared to the frequencies in the frequency band of the second receiver to determine whether the interfering first signal is a harmonic multiple of at least one frequency in the frequency band of the second receiver. If the frequency of the interfering first signal is not a harmonic multiple of a frequency in the frequency band of the second receiver, the flow proceeds to block 518. At block 518, the process may stop without implementing interference cancelation, since the interfering first signal will not interfere with the desired second signal. Conversely, if the frequency of the interfering first signal is a harmonic multiple of a frequency in the frequency band of the second receiver, then the interfering first signal may interfere with the desired second signal at the second receiver to produce a composite signal, which includes components of the interfering first signal. The flow then proceeds to block 522. At block 522, a controller may cause an adaptive filter to reconstruct at least a portion of the interfering first signal, producing a cancelation signal. The cancelation signal may be subtracted from the composite signal to generate an improved second signal. The improved second signal may be closer in fidelity to the desired second signal than the composite signal.

It should be understood that the operations described in FIG. 5 are only examples. In some embodiments a first receiver may perform some of the operations, while a second receiver performs other operations. For example, blocks 502, 506 may be implemented in a first receiver. Block 522 may be implemented in a second receiver. Blocks 510, 514, 518 may be implemented in either the first receiver or the second receiver, in various embodiments.

Figure 6:
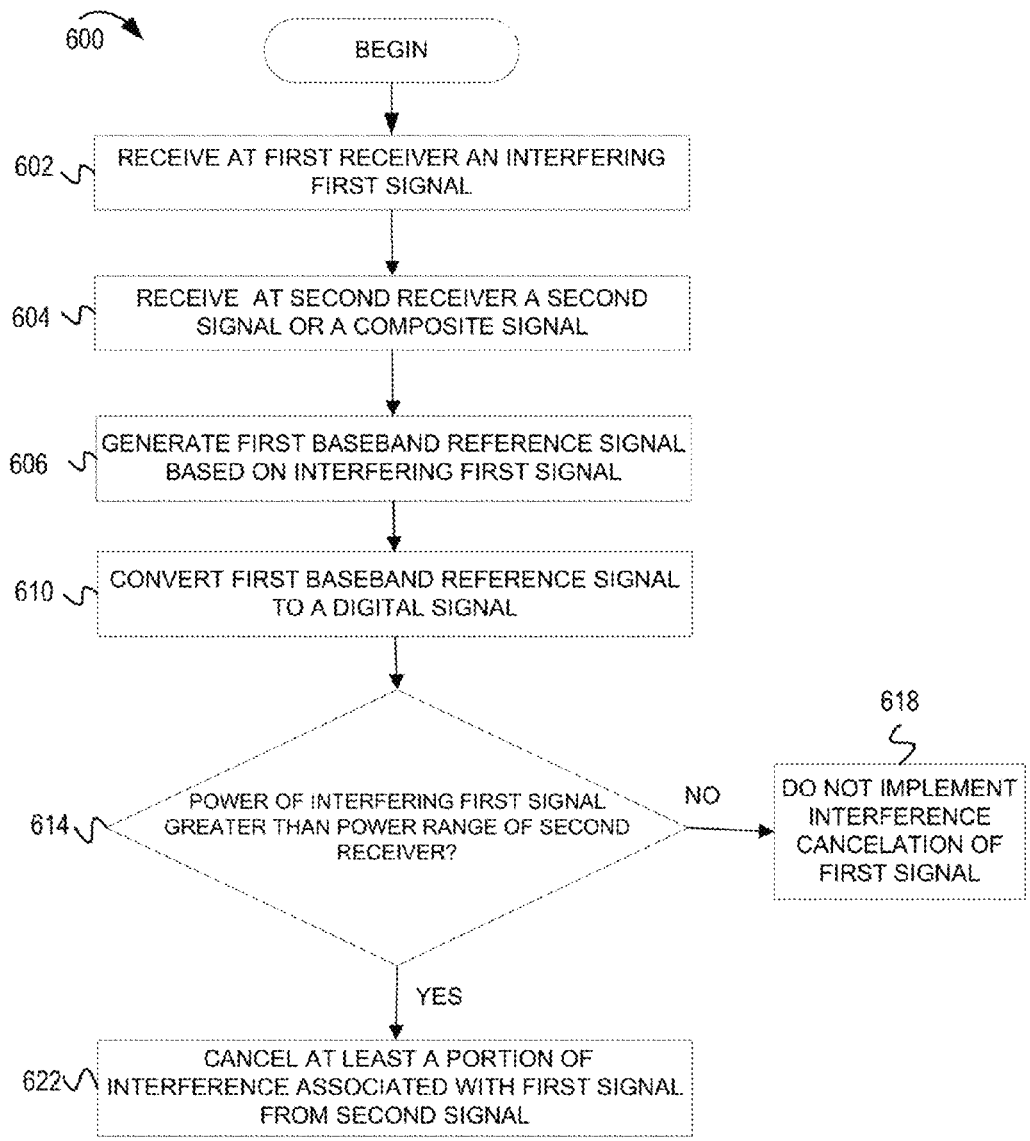
FIG. 6 is a flow diagram illustrating example operations for performing interference cancelation based, at least in part, on power of an interfering first signal in accordance with an embodiment of this disclosure.

FIG. 6 is a flow diagram 600 showing example operations performed by a first receiver and a second receiver. Blocks 602, 604, 606, 610, 618, and 622 are similar to analogous blocks in FIG. 5. At block 614, a determination is made as to whether the power of an interfering first signal is greater than the power to which a second receiver may amplify a received signal. For example, after the interfering first signal is converted to a digitized baseband reference signal, the power of the interfering first signal may be determined by a controller. The controller may compare the power of the interfering first signal and the power of the received second signal. The controller may determine whether the interfering first signal causes interference to the desired second signal based, at least in part, on the power levels of the interfering first signal and received second signal. If the power of the interfering first signal is above a threshold level relative to the received second signal, the controller may determine that the interfering first signal causes interference to the received second signal. If so determined, the controller may cause an adaptive filter to reconstruct the interfering first signal and remove it from the received second or composite signal.

In another embodiment, a controller may utilize both frequency and power to determine whether to perform interference cancelation. The controller may first determine whether a frequency of the first signal is a harmonic multiple of the frequency band of the second receiver. For example, a component of the first signal could be a second, third, or mth order harmonic multiple of a frequency in the frequency band of the second receiver. If a component of the first signal is a harmonic multiple of the frequency band of the second receiver, then the first signal possibly may interfere with or distort a second signal resulting in a composite signal that deviates from the expected second signal. Accordingly, a controller of the communication device may compare the power of the interfering first signal and the power range to which an LNA of the second receiver is capable of amplifying received signals. If the power of the first signal is greater than the power range to which the LNA of the second receiver is capable of amplifying received signals (or greater than a power threshold), then the controller may send a message to the adaptive filter of the second receiver to cause the adaptive filter to reconstruct the interfering first signal and remove at least a portion of interference associated with the interfering first signal from the composite signal.

Figure 7:
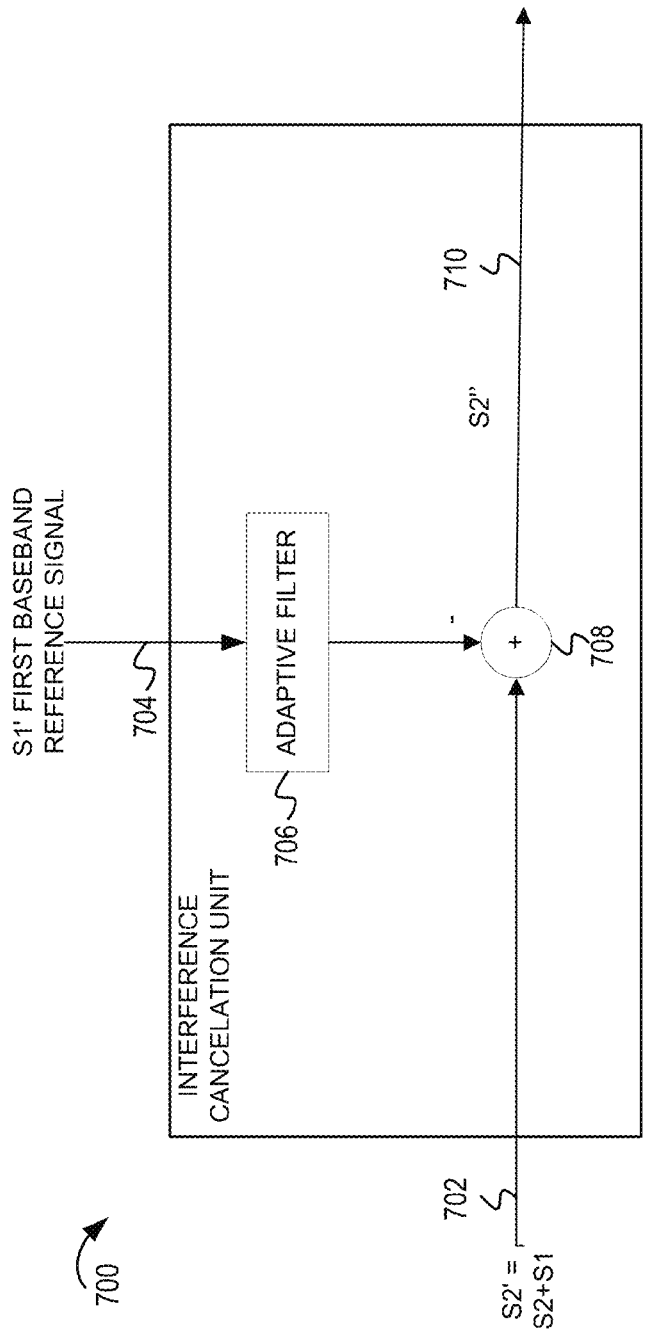
FIG. 7 is a diagram showing an example interference cancelation unit in accordance with an embodiment of this disclosure.

FIG. 7 depicts an example interference cancelation unit 700 according to one embodiment. The interference cancelation unit 700 may include an adaptive filter 706 and a combiner 708. The combiner may 708 may receive a composite signal 702, denoted as S2'. The composite signal S2' may be comprised of a desired second signal S2 and at least a portion of an interfering first signal S1'. The interfering first signal may induce distortions in the desired second signal S2 so that the composite signal S2' might be the desired second signal S2 with distortions at various harmonics. The adaptive filter may receive the first baseband reference signal 704, denoted as S1'. The adaptive filter 706 may reconstruct the interfering first signal S1 based, at least in part, on the first baseband reference signal 704. The first baseband reference signal 704 may be subtracted from the composite signal 702 to generate an improved second signal 710, denoted S2". The improved second signal S2" 710 may be closer in fidelity to the desired second signal S2 than the composite signal S2' 702. In one embodiment, the improved second signal S2" 710 may be equivalent to the desired second signal S2.

Figure 8:
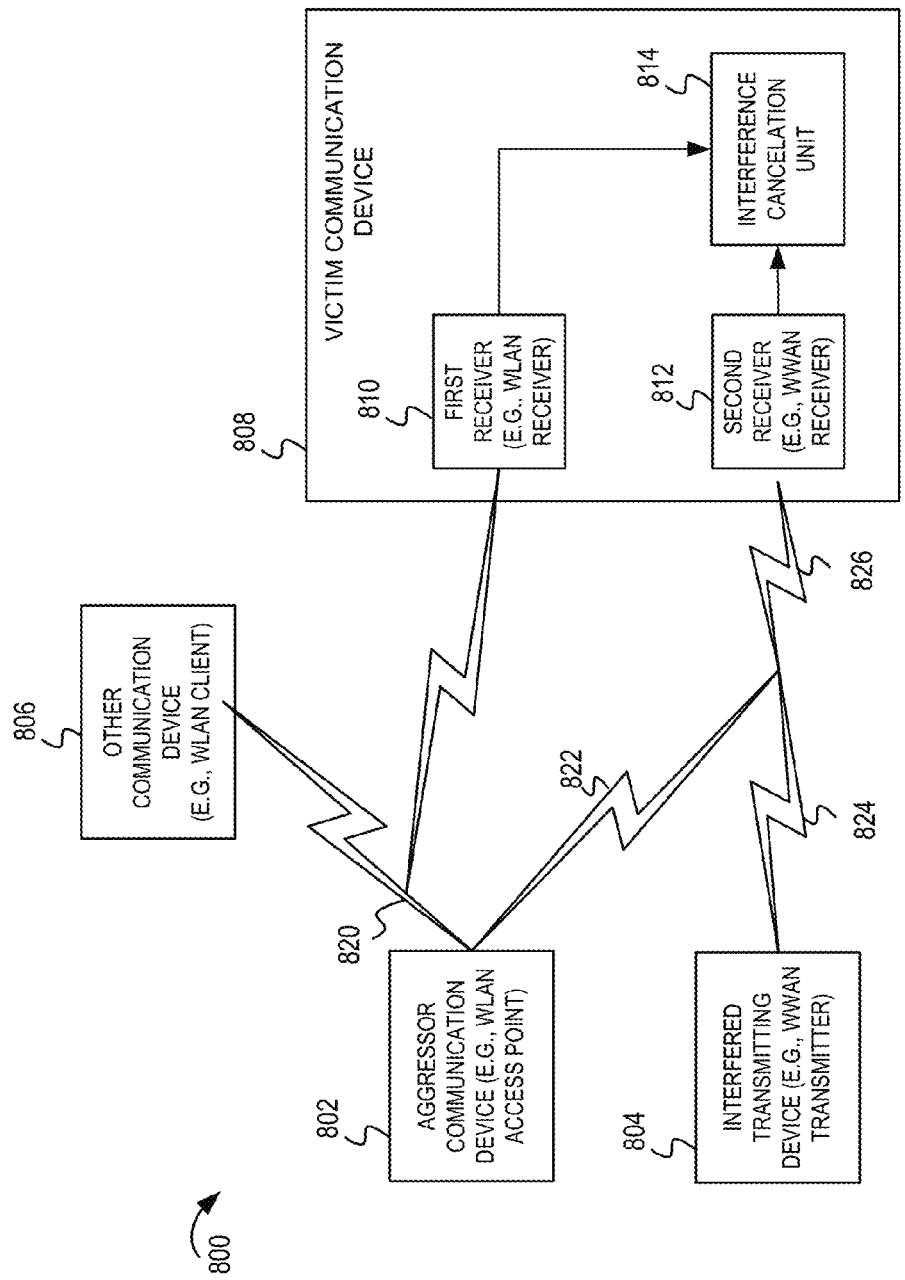
FIG. 8 is another example system diagram showing interference cancelation by opportunistically sensing an interfering first signal in accordance with an embodiment of this disclosure.

FIG. 8 depicts an example communication system 800 that includes an aggressor communication device 802, an interfered transmitting device 804, another communication device 806, and a victim communication device 808. The victim communication device 808 may include a first receiver 810, a second receiver 812, and an interference cancelation unit 814. The aggressor communication device 802 may transmit a signal, referred to as the intended first signal 820, intended for the other communication device 806. The intended first signal 820 may interfere with a desired second signal 824 intended for the second receiver 812. The interference 822 might corrupt the desired second signal 824, causing the second receiver 812 to receive a composite signal 826.

Even though the intended first signal 820 is intended for the other communication device 806, the first receiver 810 of the victim communication device 808 may detect the intended first signal 820 (shown as a copy of the intended first signal 821). In one embodiment, the first receiver 810 may periodically or permanently monitor for the copy of the intended first signal 821. In one embodiment, the first receiver 810 may monitor a broadcast channel, scheduling channel, or other channel to determine whether the first receiver 810 should detect for interfering signals that may interfere with the desired second signal 824. In another embodiment, the second receiver 812 may be configured to receive a desired second signal 824 at deterministic time periods. The first receiver 810 may monitor at those deterministic time periods at which the second receiver 812 is expected to receive the desired second signal 824. Accordingly, the first receiver 810 may detect an intended first signal 820 that may interfere with 822 the desired second signal 824.

The first receiver 810 may determine whether the intended first signal 820 may interfere with the desired second signal 824 based at least in part on characteristics of the copy of the intended first signal 821 and characteristics of the desired second signal 824. For example, the frequency of the intended first signal 821 may be compared with the frequency band of the second receiver 812 to determine whether the intended first signal 821 is a harmonic multiple of any frequency in the frequency band of the second receiver 812. As discussed above, if the frequency of the intended first signal 820 is a harmonic multiple of a frequency in the frequency band of the second receiver 812, then the first receiver 810 may implement reconstruction and cancelation of the interference 822 at the interference cancelation unit 814.

In some embodiments, the victim communication device 808 may include more than two receivers. For example, a victim communication device 808 may include multiple receivers to detect multiple transmitted signals that potentially may interfere with a desired second signal 824 intended to be received at a second receiver 812. Similarly, the victim communication device 808 may include more than one interference cancelation unit 814 to reconstruct interference from aggressor communication devices other than the aggressor communication device 802.

In the foregoing example embodiments, a victim communication device is described as having two receivers. However, it should be understood that the victim communication device may have more than two receivers. For example, if the victim communication device has three receivers, the third receiver may be used to detect the presence of a further interfering signal (such as from a second aggressor communication device). Furthermore, one or more of the receivers may include more than one antenna. For example, if the first receiver is a multiple-input-multiple-output (MIMO) receiver, the first receiver may demodulate a MIMO signal, reconstruct the baseband signal, and send the baseband signal to the second receiver for interference cancellation. Further examples in which multiple receivers and antennas may be readily conceived by persons of skill in the art.

It should be understood that FIGS. 1-8 and the operations described herein are examples meant to aid in understanding embodiments and should not be used to limit embodiments or limit scope of the claims. Embodiments may perform additional operations, fewer operations, operations in parallel or in a different order, and some operations differently. Furthermore, although described as two wireless receivers, this disclosure may apply to devices which have wired receivers or a combination of wired and wireless receivers. For example, in one embodiment, a first receiver of a communication device may be a wireless receiver and the second receiver of the same communication device may be a wired receiver. Non-linear interference cancelation may be applied to remove at least a portion of the first signal that has leaked into the wired communication medium.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein.

Any combination of one or more non-transitory machine-readable medium(s) may be utilized. Non-transitory machine-readable media comprise all machine-readable media, with the sole exception being a transitory, propagating signal. The non-transitory machine readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code embodied on a machine readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
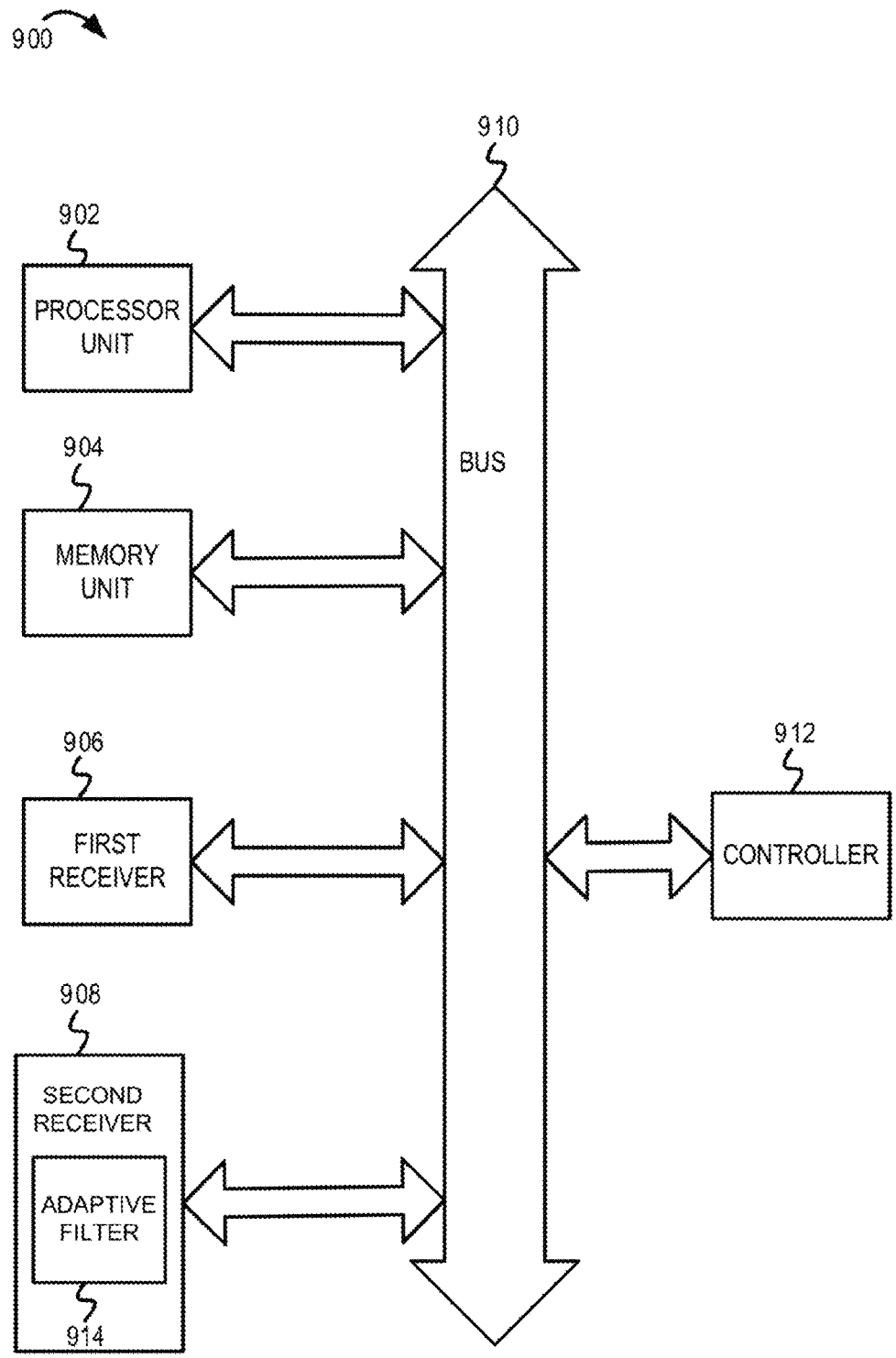
FIG. 9 is a block diagram of an example communication device capable of performing interference cancelation in accordance with an embodiment of this disclosure.

FIG. 9 depicts an example communication device 900 that includes a first receiver 906, a second receiver 908, a processor unit 902, a memory unit 904, and at least one controller 912. The communication device 900 includes a processor unit 902 (possibly including multiple processors, multiple cores, multiple nodes, and/or implementing multi-threading, etc.). The communication device 900 includes memory unit 904. The memory unit 904 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The communication device also includes a bus 910 (e.g., PCI, ISA, PCI-Express, HyperTransport®, InfiniBand®, NuBus, etc.). Additionally, the communication device 900 may include a controller 912. The controller 912 itself may include a memory unit and a processor unit. Moreover, the communication device 900 may include a first receiver 906 and a second receiver 908. The second receiver 908 may include an adaptive filter 914. The first receiver 906, the second receiver 908, and the controller 912 may be configured to implement various techniques described above. Further, realizations may include fewer or additional components not illustrated in FIG. 9 (e.g., ADCs and other filters not depicted). The processor unit 902, the memory unit 904, the first receiver 906, the second receiver 908, and the controller 912 are coupled to the bus 910. Although illustrated as being coupled to the bus 910, the memory unit 904 may be coupled to the processor unit 902.

While the embodiments are described with reference to various implementations and exploitations, it will be understood that these embodiments are illustrative and that the scope of the disclosure is not limited to them. In general, techniques for causing a first receiver to sense a signal that may interfere with the reception of a second signal at a second receiver as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
   determining, based at least in part on a time period, whether a first receiver of a communication device is to detect an interfering first signal;
   detecting, at the first receiver, the interfering first signal during the time period;
   receiving, at a second receiver of the communication device, a composite signal that comprises a desired second signal intended for the second receiver; and
   performing interference cancelation to remove at least a portion of interference caused by the interfering first signal from the composite signal to obtain the desired second signal.

2. The method of claim 1, further comprising:
   generating a first baseband reference signal based, at least in part, on the interfering first signal,
   wherein the interference cancelation is based, at least in part, on the first baseband reference signal from the first receiver.

3. The method of claim 2, further comprising:
   preparing a cancelation signal based, at least in part, on the first baseband reference signal.

4. The method of claim 2, wherein generating the first baseband reference signal comprises down-converting the interfering first signal to an analog baseband reference signal.

5. The method of claim 4, wherein generating the first baseband reference signal further comprises:
   performing an analog-to-digital conversion of the analog baseband reference signal at an analog-to-digital converter of the first receiver to convert the analog baseband reference signal into a digital baseband reference signal.

6. The method of claim 5, further comprising conveying the digital baseband reference signal to the second receiver.

7. The method of claim 4, wherein generating the first baseband reference signal further comprises conveying the analog baseband reference signal to a first analog-to-digital converter of the second receiver.

8. The method of claim 7 wherein conveying the analog baseband reference signal further comprises:
   synchronizing the first analog-to-digital converter of the second receiver with a second analog-to-digital converter of the second receiver such that a sampling rate of the first analog-to-digital converter is substantially synchronized with a sampling rate of the second analog-to-digital converter; and
   performing an analog-to-digital conversion of the analog baseband reference signal into a digital baseband reference signal.

9. The method of claim 1, further comprising determining to bypass the interference cancelation based, at least in part, on a determination that a power of the interfering first signal is less than a threshold power.

10. The method of claim 9, wherein the threshold power is associated with a power range of an amplifier of the second receiver.

11. The method of claim 1, wherein the first receiver is associated with a first communication protocol and the second receiver is associated with a second communication protocol different from the first communication protocol.

12. The method of claim 11, wherein the first receiver is a wireless local area network (WLAN) receiver and the second receiver is a wireless wide area network (WWAN) receiver.

13. The method of claim 1, further comprising:
   determining a first frequency associated with the interfering first signal;
   determining to bypass interference cancelation in response to determining that the first frequency is not a harmonic multiple of a second frequency in a frequency band of the second receiver;
   determining to perform interference cancelation in response to determining that the first frequency is a harmonic multiple of a second frequency in the frequency band of the second receiver.

14. The method of claim 1, wherein performing interference cancelation includes configuring an adaptive filter at the second receiver to reproduce at least a portion of the interfering first signal based, at least in part, on the interfering first signal.

15. The method of claim 1, wherein performing interference cancelation comprises performing non-linear interference cancelation.

16. A communication device comprising:
a first receiver configured to:
determine, based at least in part on a time period, whether to detect an interfering first signal;
detect the interfering first signal during the time period;
a second receiver configured to receive a composite signal that comprises a desired second signal intended for the second receiver; and
an interference cancelation unit configured to perform interference cancelation to remove at least a portion of interference caused by the interfering first signal from the composite signal to obtain the desired second signal.

17. The communication device of claim 16, wherein the first receiver is further configured to:
generate a first baseband reference signal based, at least in part, on the interfering first signal, wherein the interference cancelation is based, at least in part, on the first baseband reference signal from the first receiver.

18. The communication device of claim 17, wherein the interference cancelation unit is further configured to prepare a cancelation signal based, at least in part, on the first baseband reference signal.

19. The communication device of claim 17, further comprising a down-converter configured to down-convert the interfering first signal to an analog baseband reference signal.

20. The communication device of claim 19, further comprising an analog-to digital converter configured to:
convert the analog baseband reference signal into a digital baseband reference signal; and
convey the digital baseband reference signal to the second receiver.

21. The communication device of claim 20, wherein the down-converter is further configured to convey the analog baseband reference signal to a first analog-to-digital converter of the second receiver at which the analog baseband reference signal is converted into the digital baseband reference signal.

22. The communication device of claim 16, further comprising:
a controller configured to determine to bypass the interference cancelation based, at least in part, on a determination that a power of the interfering first signal is less than a threshold power.

23. The communication device of claim 22, wherein the threshold power is associated with a power range of an amplifier of the second receiver.

24. The communication device of claim 16, wherein the first receiver is further configured to monitor a channel that provides a schedule;
wherein the time period is determined according to the schedule.

25. The communication device of claim 16, wherein the second receiver is further configured to receive the second signal at a deterministic time period, and wherein the time period comprises the deterministic time period.

26. A non-transitory machine-readable medium having machine executable instructions which, when executed by a processor of a communication device, cause the communication device to:
determining, based at least in part on a time period, whether a first receiver of the communication device is to detect an interfering first signal;
detect, at the first receiver, an interfering first signal during the time period;
receive, at a second receiver of the communication device, a composite signal that comprises a desired second signal intended for the second receiver; and
determine a first frequency associated with the interfering first signal;
perform the interference cancelation to remove at least a portion of interference caused by the interfering first signal from the composite signal to obtain the desired second signal.

27. The non-transitory machine-readable medium of claim 26, wherein the machine executable instructions, when executed by the processor of the communication device, cause the first receiver of the communication device to generate a first baseband reference signal based, at least in part, on the interfering first signal, wherein the interference cancelation is based, at least in part, on the first baseband reference signal from the first receiver.

28. The non-transitory machine-readable medium of claim 27, wherein the machine executable instructions, when executed by the processor of the communication device, cause the communication device to prepare a cancelation signal based, at least in part, on the first baseband reference signal.

29. The non-transitory machine-readable medium of claim 26, wherein the machine executable instructions, when executed by the processor of the communication device, cause the communication device to determine to bypass the interference cancelation further based, at least in part, on a determination that a power of the interfering first signal is less than a threshold power.

30. The non-transitory machine-readable medium of claim 29, wherein the threshold power is associated with a power range of an amplifier of the second receiver.

* * * * *